April 1, 1930.  C. N. MITCHELL  1,752,685
PISTON
Filed March 16, 1928
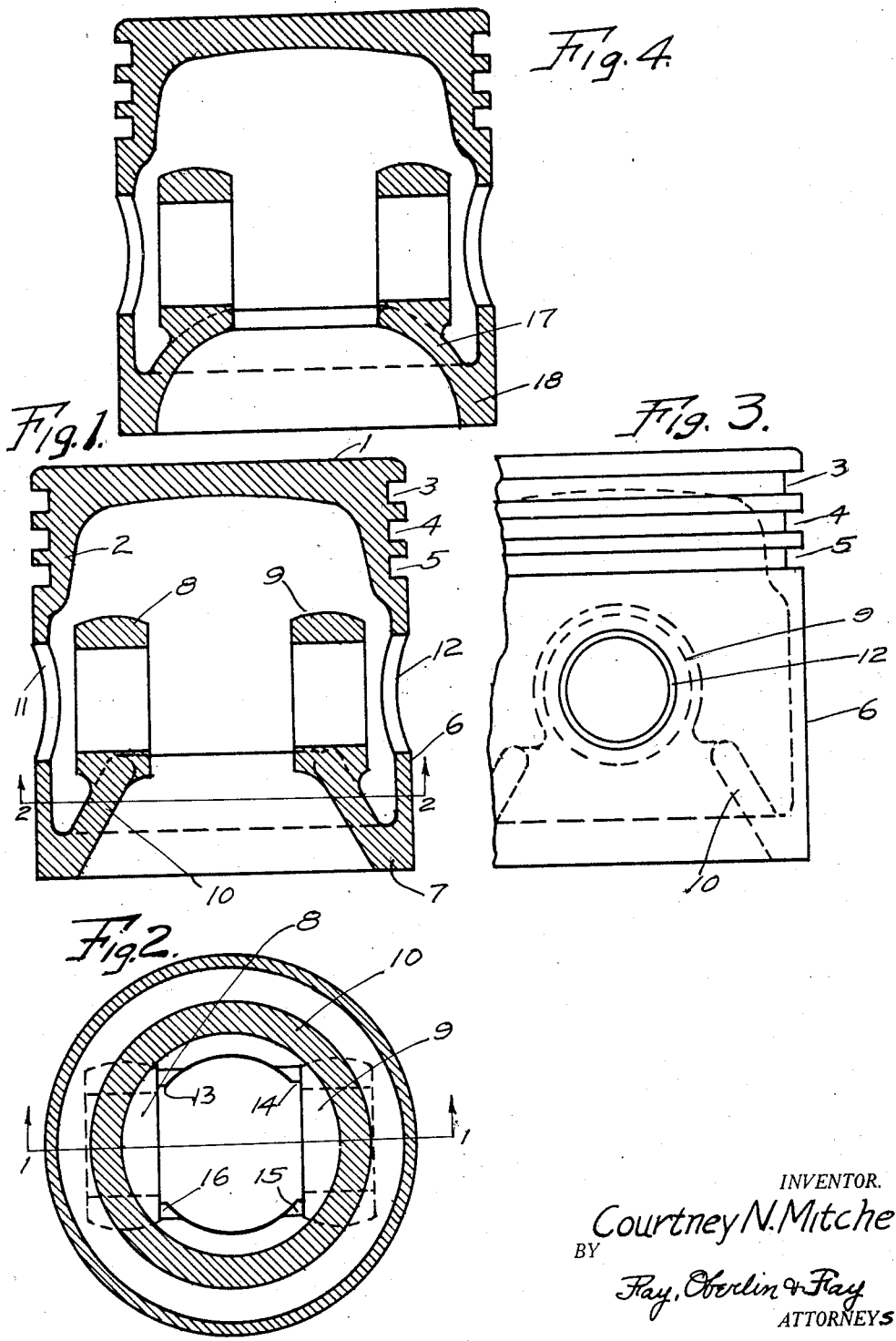
INVENTOR.
Courtney N. Mitchell
BY
Ray, Oberlin & Ray
ATTORNEYS Patented Apr. 1, 1930

1,752,685

UNITED STATES PATENT OFFICE

COURTNEY N. MITCHELL, OF CLEVELAND, OHIO

PISTON

Application filed March 16, 1928. Serial No. 262,078.

This invention relates to pistons, primarily for internal combustion engines or any similar machine in which the heat from the working fluid is excessive, and tends to expand materially the parts with which it comes in contact.

An object of this invention is to provide a piston adapted to prevent distortion in its cylindrical part due to internal strains set up by a rise in temperature of the piston. Another object is to provide a means of support for the piston pin in the piston which shall be far enough removed from the hottest part of the piston so that no appreciable distortion in the piston pin bearing can take place. A further object is to provide a piston of light weight and strong construction readily adaptable to the best manufacturing practice.

This construction is particularly adaptable to pistons made from aluminum alloys and other materials having large co-efficients of expansion. In order for a piston to operate satisfactorily in its cylinder, a definite amount of clearance between the piston and cylinder wall must be maintained. From experience it is known that the head or top of the piston is maintained at a higher temperature than any other part of the combustion space and dissipates practically all of its heat through the packing rings to the cylinder walls from whence it is taken up by the cooling jacket. The metal of the piston adjacent to the packing rings is thus maintained at a relatively high temperature and much heat is transferred to the bosses for the piston pin when the piston is constructed in the usual way with the bosses cast as part of the wall of the piston or with transverse ribs joining the bosses to the head or ring section of the piston. This localization of heat does not tend to expand the piston as a whole, but causes some portions to expand more than others and the resulting distortion produces tight fits of the piston along some diameters and abnormal looseness on other diameters, resulting in heavy localized contact and destructive wear of some portions of the piston. In order to prevent this irregular expansion from doing excessive damage, various arrangements have been used heretofore such as coring or cutting out large portions of metal, cutting slots in the sides of the piston or inserting tie bars of other and heavier metals which are not materially affected by heat.

From the foregoing it will be understood that the principal difficulties in using pistons made of light alloy metals of high coefficient of expansion result from distortion rather than from direct, uniform expansion. In order to prevent distortion, the most essential thing is to eliminate irregular sections which are subject to receiving appreciable amounts of heat. Inasmuch as practically all the heat from the head of the piston is transferred to the cylinder walls by the piston rings, it is evident that the skirt or lower part of the piston which acts as the guide in the cylinder will be maintained at a temperature very little if any above the temperature of the cylinder wall and the tendency for relative expansion between the piston and cylinder is very small. The upper part of the piston carrying the rings is made considerably smaller in its outer diameter than the cylinder so that the rings alone contact with the cylinder wall and even an appreciable expansion of the metal of this part of the piston can never cause any of this part of the piston to contact with the cylinder.

In order to obtain a piston of the desired character, this invention provides a unit of uniform circular section of all parts contacting with or adjacent to the parts contacting with the cylinder walls. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a vertical transverse section on the line 1—1 of Fig. 2 of the improved piston; Fig. 2 is a horizontal section on line 2—2 of Fig. 1; Fig. 3 is a side elevation of the piston; Fig. 4 is a section similar to that of Fig. 1, but showing an alternative construction.

In Fig. 1 the head 1 of the piston is joined by a heavy section of metal to the cylindrical portion 2 which is provided with ring grooves 3, 4, and 5. Below the portion 2 the skirt or trunk 6 of the piston extends as a perfect cylinder of substantially uniform thickness to its lower extremity, terminating in an integral reinforcing ring 7. The bosses 8 and 9 which carry the piston pin are supported by the wall 10 which is in the shape of an upright truncated cone. The rim of the base of this conical wall is integral with reinforcing ring 7 and the bosses 8 and 9 are supported at the upper rim of the cone. This conical structure is very strong in reference to transmitting both vertical loads and horizontal ones. The cylindrical skirt of the piston joined to this truncated cone is also very strong in reference to the transmission of gas pressures and inertia forces to the piston pin bosses through the conical section. Holes 11 and 12 are provided in the walls of the skirt 6 for the purpose of machining the holes in bosses 8 and 9 and for the assembly of the piston pin. A portion of the upper rim of the conical wall is cut away as shown at 13, 14, 15, and 16, in Fig. 2, by the machining operations on the inner faces of bosses 8 and 9.

In Fig. 4 the conical section is replaced by a spherical section or an approximately spherical section 17 which has advantages over the conical form as shown in Fig. 1, in that it permits the use of a deeper rim 18 with a better opportunity of piloting the piston from its open end for machining purposes. A further advantage is found in being able to use somewhat thinner sections of metal than is feasible with the conical supporting member as shown in Fig. 1.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. A piston having a cylindrical body, a conical section adjoining the open end of said cylindrical body, and wrist pin bosses attached to the portion of said conical section farthest removed from the cylindrical body of said piston.

2. In a piston having the usual head and ring groove sections, a cylindrical skirt of substantially uniform thickness joined to the ring groove section, said skirt terminating in a reinforcing ring, a conical section having its bottom integral with said ring, and a pair of piston pin bosses secured to said conical section at the upper end of the latter.

3. A piston having the usual head and ring groove sections at its upper end, and a cylindrical skirt, a truncated cone integral with the open end of said skirt and projecting upwardly into said piston, and a pair of piston pin bosses secured to the free end of said cone.

4. A piston having a head, a ring groove section, a skirt adjoined thereto, and pin bosses within said piston, said pin bosses being carried at the free end of an intermediary wall connected to said skirt, all sections of said intermediary wall being concentric with those of said skirt.

Signed by me this 14th day of March, 1928.

COURTNEY N. MITCHELL.